(12) United States Patent
Wu et al.

(10) Patent No.: US 9,489,705 B2
(45) Date of Patent: Nov. 8, 2016

(54) DISPLAY DEVICE AND METHOD OF DISPLAYING IMAGE CAPABLE OF AVOIDING COLOR SHIFT IN A LARGE VIEWING ANGLE

(71) Applicant: SHENZHEN CHINA STAR OPTOELECTRONICS TECHNOLOGY CO., LTD., Shenzhen (CN)

(72) Inventors: Yu Wu, Shenzhen (CN); Wei Fu, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 379 days.

(21) Appl. No.: 14/233,778

(22) PCT Filed: Dec. 9, 2013

(86) PCT No.: PCT/CN2013/088842
§ 371 (c)(1),
(2) Date: Jan. 20, 2014

(87) PCT Pub. No.: WO2015/081577
PCT Pub. Date: Jun. 11, 2015

(65) Prior Publication Data
US 2015/0154723 A1 Jun. 4, 2015

(30) Foreign Application Priority Data
Dec. 3, 2013 (CN) .......................... 2013 1 0638604

(51) Int. Cl.
*G06T 1/00* (2006.01)
*G09G 5/00* (2006.01)
*H04N 13/04* (2006.01)
*G09G 3/00* (2006.01)
*G09G 3/36* (2006.01)

(52) U.S. Cl.
CPC ................. *G06T 1/00* (2013.01); *G09G 3/003* (2013.01); *G09G 3/3659* (2013.01); *G09G 5/006* (2013.01); *H04N 13/0497* (2013.01); *G09G 2300/0443* (2013.01); *H04N 13/0454* (2013.01)

(58) Field of Classification Search
CPC ............ G06T 1/00; G09G 2300/0443; G09G 3/003; G09G 3/3659; G09G 5/006; H04N 13/0454; H04N 13/0497
See application file for complete search history.

(56) References Cited

U.S. PATENT DOCUMENTS

2013/0100108 A1* 4/2013 Chiang ................ G09G 3/3659
345/212
2013/0235091 A1* 9/2013 Tsai ....................... G09G 3/003
345/690

(Continued)

*Primary Examiner* — Lun-Yi Lao
*Assistant Examiner* — Elliott Deaderick
(74) *Attorney, Agent, or Firm* — Mark M. Friedman

(57) ABSTRACT

A display device and a method for displaying an image are proposed. The first TFT and the second TFT are connected to a scan line and a data line. The first TFT and the second TFT are connected to a first sub-pixel area and a second sub-pixel area respectively. A switch unit is used for turning on/off a first current channel when the display panel is under 2D/3D display mode. The switch unit includes a third TFT for receiving a first control signal and turning a first current channel on or off according to the first control signal, and a fourth TFT for receiving a second control signal and the first control signal and providing the third TFT with the first control signal according to the second control signal.

9 Claims, 3 Drawing Sheets

(56) References Cited

U.S. PATENT DOCUMENTS

| | | | | |
|---|---|---|---|---|
| 2013/0335393 A1* | 12/2013 | Wang | ............... | H04N 13/0429 345/212 |
| 2014/0035968 A1* | 2/2014 | Chen | ............... | G09G 5/02 345/691 |
| 2015/0036067 A1* | 2/2015 | Xue | ............... | G09G 3/003 349/15 |

* cited by examiner

DISPLAY DEVICE AND METHOD OF DISPLAYING IMAGE CAPABLE OF AVOIDING COLOR SHIFT IN A LARGE VIEWING ANGLE

BACKGROUND OF THE INVENTION

1. Field of the Invention

The present invention relates to a display technology field, more particularly, to a display device and a display method thereof.

2. Description of the Prior Art

To solve a problem of color shift in a large viewing angle, conventional display devices usually apply Low Color Shift (LCS) technology, more particularly, dividing a sub-pixel unit 100 of a pixel unit into a main area 101 and a sub area 102. As FIG. 1 indicates, the main area 101 and the sub area 102 are applied with respective driving voltages to generate different luminance, so that luminance deviation of the pixel unit is not significant in different viewing angles.

The inventor finds a practical problem of conventional arts as follow:

when the sub area 102 is in a moment between two frames with different polarities, greater voltage drop applied on the sub area 102 causes greater luminance variety; when the sub area 102 is in a moment between two frames with the same polarities, less voltage drop applied on the sub area 102 causes less luminance variety. Therefore, luminance of the sub area 102 is different when the sub area 102 is in a moment between two consecutive frames.

Furthermore, when the display device is under a three-dimensional display mode, one of left-eye and right eye frames is always in a situation of the same polarity, and the other is always in a situation of alternative polarities. As a result, luminance of the sub area 102 visible to left and right eyes of a viewer respectively is always different, causing uncomfortable to the viewer.

Therefore, a new scheme is needed to solve the problem.

SUMMARY OF THE INVENTION

It is therefore an object of the present invention is to provide a display device and a method of displaying an image using the display device capable of avoiding color shift in a large viewing angle under two-dimensional display mode, and displaying identical luminance of left eye and right eye images under a three-dimensional display mode, avoiding uncomfortable to the viewer.

According to the present invention, a display device comprises: a display panel, comprising one or more pixel units, each pixel unit comprising one or more sub-pixel unit. The sub-pixel unit comprises a first sub-pixel area, a second sub-pixel area, a first Thin Film Transistor (TFT) connected to a first scan line, a first data line, and the first sub-pixel area, a second TFT connected to the first scan line, the first data line and the second sub-pixel area, a capacitor for receiving electrical charge of the second sub-pixel area, and a switch unit for turning on a first current channel between the capacitor and the second sub-pixel area when the display panel is under two-dimensional display mode and turning off the first current channel when the display panel is under three-dimensional display mode. The switch unit receives a first control signal and turns the first current channel on or off according to the first control signal, in order to control voltage difference between the first sub-pixel area and the second sub-pixel area. The switch unit comprises a third TFT for receiving the first control signal and turning the first current channel on or off according to the first control signal. The third TFT comprises a third drain, a third source, and a third gate for receiving the first control signal. One of the third drain and the third source is connected to the capacitor, and the other is connected to the second sub-pixel area.

In one aspect of the present invention, the switch unit further comprises a fourth TFT for receiving a second control signal and the first control signal and providing the third gate of the third TFT with the first control signal according to the second control signal. The fourth TFT comprises a fourth drain, a fourth source, and a fourth gate for receiving the second control signal in order to control the second current channel between the fourth drain and the fourth source on or off. One of the fourth drain and the fourth source is connected to the third gate of the third TFT, and the other is connected to the second scan line of the display panel.

In another aspect of the present invention, the first control signal is gate switching signal sent by the second scan line.

In another aspect of the present invention, the second control signal is at high voltage level to turn on the second current channel when the display panel is under two-dimensional display mode; the second control signal is at low voltage level to turn off the second current channel when the display panel is under three-dimensional display mode.

In another aspect of the present invention, the pixel unit further comprises a sharing line comprising a first section and a second section. One of the fourth drain and the fourth source is connected to the third gate of the third TFT through the first section, and the other is connected to the second scan line of the display panel through the second section.

According to the present invention, a display device comprises: a display panel, comprising one or more pixel units, each pixel unit comprising one or more sub-pixel unit. The sub-pixel unit comprises a first sub-pixel area, a second sub-pixel area, a first Thin Film Transistor (TFT) connected to a first scan line, a first data line, and the first sub-pixel area, a second TFT connected to the first scan line, the first data line and the second sub-pixel area, a capacitor for receiving electrical charge of the second sub-pixel area, and a switch unit for turning on a first current channel between the capacitor and the second sub-pixel area when the display panel is under two-dimensional display mode and turning off the first current channel when the display panel is under three-dimensional display mode.

In one aspect of the present invention, the switch unit is used for receiving a first control signal and turns the first current channel on or off according to the first control signal.

In another aspect of the present invention, the switch unit is used for controlling voltage difference between the first sub-pixel area and the second sub-pixel area according to the first control signal.

In another aspect of the present invention, the switch unit comprises a third TFT for receiving the first control signal and turning the first current channel on or off according to the first control signal. The third TFT comprises a third drain, a third source, and a third gate for receiving the first control signal. One of the third drain and the third source is connected to the capacitor, and the other is connected to the second sub-pixel area.

In another aspect of the present invention, the switch unit further comprises a fourth TFT for receiving a second control signal and the first control signal and providing the third gate of the third TFT with the first control signal according to the second control signal. The fourth TFT comprises a fourth drain, a fourth source, and a fourth gate for receiving the second control signal in order to control the second current channel between the fourth drain and the fourth source on or off. One of the fourth drain and the fourth source is connected to the third gate of the third TFT, and the other is connected to the second scan line of the display panel.

In another aspect of the present invention, the first control signal is gate switching signal sent by the second scan line.

In another aspect of the present invention, the second control signal is at high voltage level to turn on the second current channel when the display panel is under two-dimensional display mode; the second control, signal is at low voltage level to turn off the second current channel when the display panel is under three-dimensional display mode.

In another aspect of the present invention, the pixel unit further comprises a sharing line comprising a first section and a second section. One of the fourth drain and the fourth source is connected to the third gate of the third TFT through the first section, and the other is connected to the second scan line of the display panel through the second section.

In yet another aspect of the present invention, the sharing line is shared with three sub pixel units in the pixel unit.

In another aspect of the present invention, a method of displaying image using the display device comprises: the switch unit of the display panel turning on the first current channel when the display panel of the display device is under a two-dimensional display mode; the switch unit of the display panel turning off the first current channel when the display panel is under a three-dimensional display mode. The first current channel is a current channel between the capacitor of the display panel and the second sub-pixel area.

In another aspect of the present invention, the method further comprises: the switch unit receiving the first control signal and turning on or of the first current channel according to the first control signal.

In another aspect of the present invention, the method further comprises the switch unit controlling voltage difference between the first sub-pixel area and the second sub-pixel area through the first control signal.

In another aspect of the present invention, the switch unit comprises a third TFT. The method further comprises the third gate of the third TFT receiving the first control signal. The step of the switch unit of the display panel turning on the first current channel comprises turning on the first current channel by the third TFT according to the first control signal. The step of the switch unit turning off the first current channel comprises: turning off the first current channel by the third TFT according to the first control signal.

In still another aspect of the present invention, the switch unit further comprises a fourth TFT, the method further comprises: the fourth TFT receiving a second control signal and the first control signal; the fourth TFT providing the third gate of the third TFT with the first control signal according to the second control signal.

In yet another aspect of the present invention, the second control signal is at high voltage level when the display panel is under the two-dimensional display mode, and the fourth TFT turns on the second current channel between the fourth source and the fourth drain of the fourth TFT according to the second control signal; the second control signal is at low voltage level when the display panel is under three-dimensional display mode, and the fourth TFT turns off the second current channel according to the second control signal.

Compared to the prior art, the display device of the present disclosure avoids color shift in a large viewing angle under two-dimensional display mode, and displays identical luminance of left eye and right eye images under three-dimensional display mode, avoiding uncomfortable to the viewer.

These and other features, aspects and advantages of the present disclosure will become understood with reference to the following description, appended claims and accompanying figures.

DETAILED DESCRIPTION OF PREFERRED EMBODIMENT

The present invention is described in detail in conjunction with the accompanying drawings and embodiments.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention. The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

Figure 1:
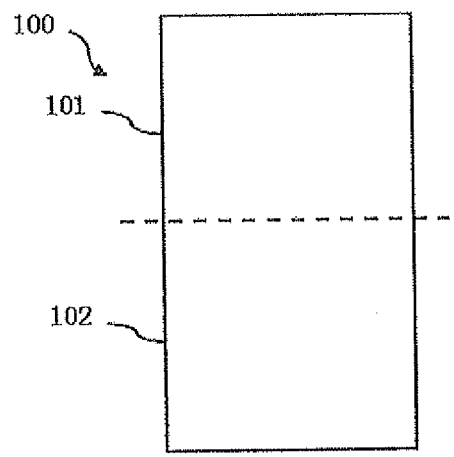
FIG. 1 shows a sub-pixel of a conventional pixel unit.
Figure 2:
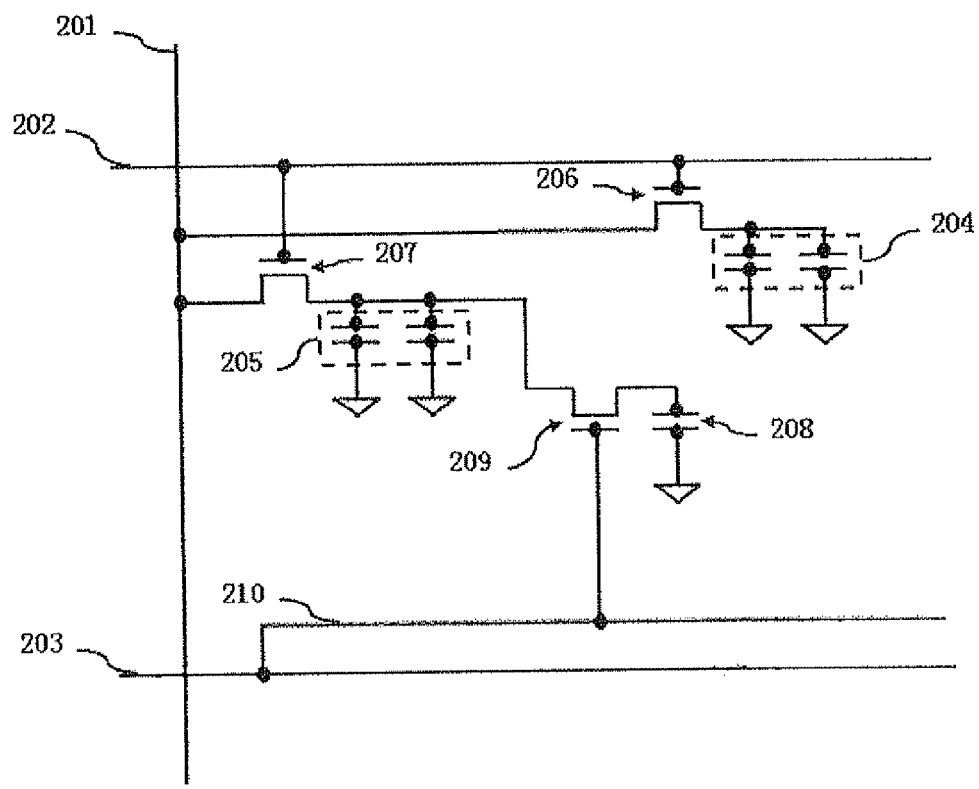
FIG. 2 is a circuit diagram of a pixel of a display device according to a first embodiment of the present invention.

Please refer to FIG. 2, a circuit diagram of a sub-pixel unit of a display device according to a first embodiment of the present invention.

The display device displays two-dimensional and three-dimensional images, and switches from a three-dimensional display mode to a two-dimensional display mode when needed, and likewise, switches from the two-dimensional display mode to the three-dimensional display mode. The display device comprises a display panel comprising one or more pixel units, each of which comprises one or more sub-pixel unit.

A sub-pixel unit comprises a first sub-pixel area 204, a second sub-pixel area 205, a first Thin Film Transistor (TFT) 206, a second TFT 207, a capacitor 208 and a switch unit.

The first TFT 206 connects to a first scan line 202, a data line 201, and the first sub-pixel area 204. The second TFT 207 connects to the first scan line 202, the first data line 201 and the second sub-pixel area 205. The capacitor 208 receives electrical charge of the second sub-pixel area 205. The switch unit turns on a first current channel between the capacitor 208 and the second sub-pixel area 205 when the display panel is under two-dimensional display mod; and turns of the first current channel when the display panel is under three-dimensional display mode.

In the embodiment, the switch receives a first control signal, and turns on or off the first current channel according to the first control signal. More particularly, the switch controls voltage difference between the first sub-pixel area 204 and the second sub-pixel area 205 through the first control signal.

In the embodiment, the switch comprises a third TFT 209, whereas the third TFT 209 receives the first control signal, and turns on and off the first current channel according to the first control signal.

The third TFT 209 comprises a third drain, a third source and a third gate.

The third gate receives the first control signal. The capacitor 208 connects to the third drain, and the third source connects to the second sub-pixel area 205; or, the capacitor 208 connects to the third source, and the third drain connects to the second sub-pixel area 205.

In the embodiment, the first control signal is gate switch signal (scan signal) sent from a second scan line 203.

Figure 3:
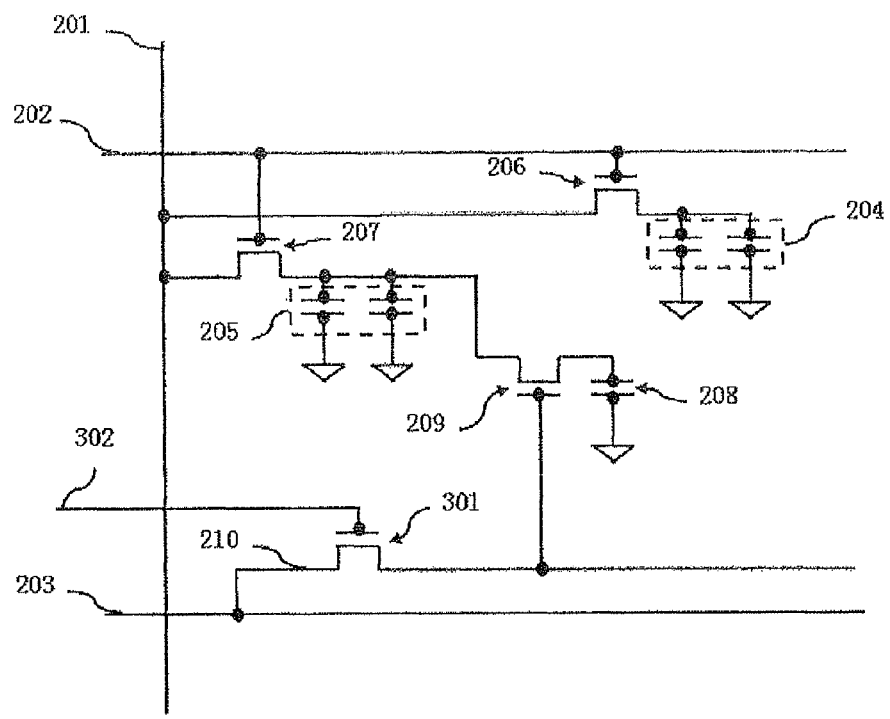
FIG. 3 is a circuit diagram of a pixel unit of the display device according to a second embodiment of the present invention.

Please refer to FIG. 3, a circuit diagram of a sub-pixel unit of the display device according to a second embodiment of the present invention. The embodiment is similar with the foregoing embodiment, except for the following differences:

In the embodiment, the switch also comprises a fourth TFT 301, which receives a second control signal and the first control signal and sends the first control signal to the third TFT 209 according to the second control signal.

The fourth TFT 301 comprises a fourth drain, a fourth source and a fourth gate.

The fourth gate receives the second control signal to turns on and off a second current channel between the fourth drain and the fourth source. The third TFT 209 connects to the fourth drain, and the fourth source connects to the second scan line 203 of the display panel; or, the third TFT 209 connects to the fourth source, and the fourth drain connects to the second scan line 203 of the display panel.

In the embodiment, the second control signal is at a high voltage level when the display panel is under the two-dimensional display mode, thus to turn on the second current channel. The second control signal is at a low voltage level when the display panel is under the three-dimensional display mode, thus to turn off the second current channel.

In the embodiment, the second control signal is inverted from the three-dimensional display enabling signal through a metal oxide semiconductor 403. As FIG. 4 indicates, numerals 401, 402, 403, 404, 405 represent an input end of three-dimensional display enabling signal, an output end of the second control signal, the metal oxide semiconductor, a power end and a ground end respectively. The input end 401 of three-dimensional display enabling signal inputs three dimensional display enabling signal (3D_EN), the output end 402 of the second control signal outputs the second control signal.

In the embodiment, the fourth TFT 301 alone controls the third TFT 209, so that the third TFT 209 is turned off when the display device is under three-dimensional display mode, and the capacitor 208 does not receive electric charge from the second sub-pixel area 205. Therefore no voltage difference exists between the second sub-pixel area 205 and the first sub-pixel area 204, hence no luminance difference exists between the second sub-pixel area 205 and the first sub-pixel area 204, in other words, the capacitor 208 has no impact upon luminance of the second sub-pixel area 205.

In the embodiment, the pixel unit comprises a sharing line 210 shared by three sub-pixel units (red, green, blue) of the pixel unit.

The sharing line 201 comprises a first section and a second section. The third gate of the third TFT 209 connects to the fourth drain through the first section, and the fourth source connects to the second scan line 203 of the display panel through the second section; or, The third gate of the third TFT 209 connects to the fourth source through the first section, and the fourth drain connects to the second scan line 203 of the display panel through the second section.

Figure 4:
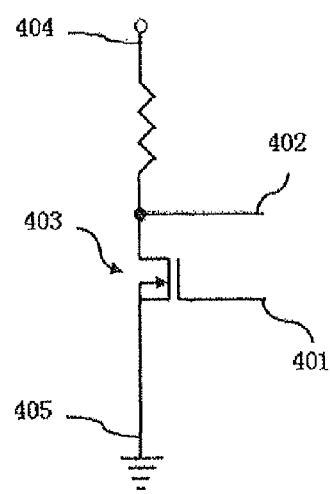
FIG. 4 shows a structure diagram of forming the second control signal.

Please refer to FIG. 4, the embodiment is exemplified as below:

The 3D_EN is inverted through the metal oxide semiconductor 403 and output from the second control signal output end 402, and then input into the fourth gate from the input end 302 of the fourth TFT 301 in order to drive the fourth TFT 301, hence the third TFT 209 is not turned on due to scan signals of the second scan line 203 when the display device is under three-dimensional display mode. More particularly, when the display device is under two-dimensional display mode, the 3D_EN is at low voltage level, and the inverted second control signal is at high voltage level. Then the switch of the fourth TFT 301 (i.e. the second current channel) is turned on and the scan signals of the second scan line 203 is input into the third TFT 209, thus the switch of the third TFT 209 (i.e. the first current channel) is turned on and electrical charge of the second sub-pixel area 205 is input into the capacitor 208. Then voltage difference appears between the first sub-pixel area 204 and the second sub-pixel area 205, and luminance difference appears between the first sub-pixel area 204 and the second sub-pixel area 205, thus color shift in a large viewing angle during two-dimensional display mode of the display device is solved.

When the display device is under three-dimensional display mode, the 3D_EN is at high voltage level, and the inverted second control signal is at low voltage level. Then the switch of the fourth TFT 301 the second current channel) is turned off and the scan signals of the second scan line 203 is not input into the gate of the third TFT 209, thus the third TFT 209 does not turn on the first current channel and electrical charge of the second sub-pixel area 205 does not flow into the capacitor 208. Voltage applied on the first sub-pixel area 204 and voltage applied on the second sub-pixel area 205 are identical, and luminance of the first sub-pixel area 204 and that of the second sub-pixel area 205 are identical, so that luminance of the left-eye image and that of the right-eye image are identical.

Figure 5:
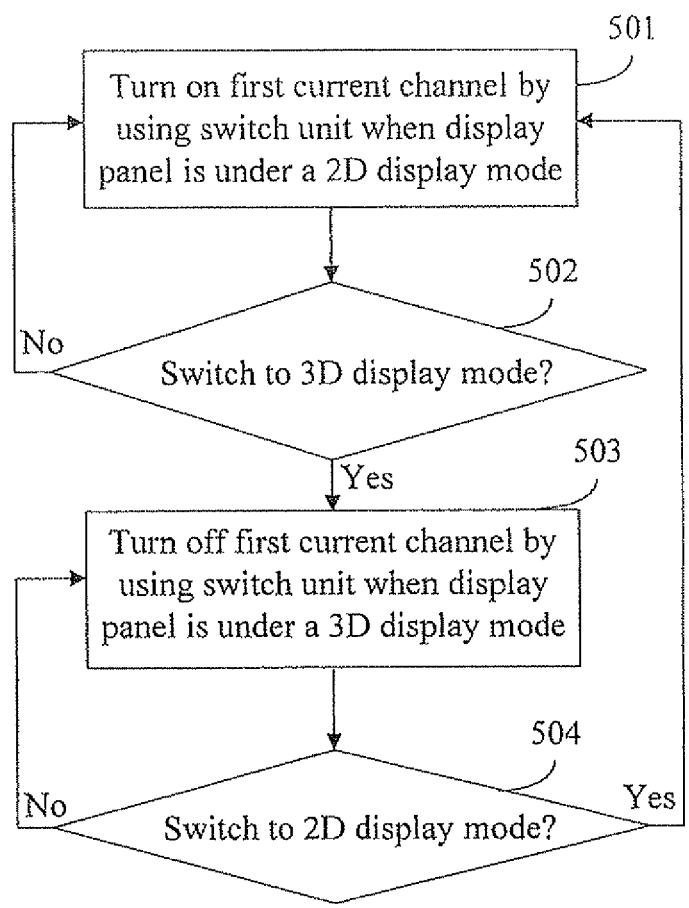
FIG. 5 indicates a flow chart of a method of displaying images using the display device of the present invention.

FIG. 5 indicates a flow chart of a method of displaying images using the display device of the present invention. The method of the present invention is applied in the display device of the present invention.

The method of displaying images using the display device comprises:

Step 501: turning on the first current channel by using the switch unit of the display panel when the display panel is under a two-dimensional display mode;

Step 502: Does the display device switch from the two-dimensional display mode to the three-dimensional display mode? if yes, proceeding to step 503, otherwise continuing step 501;

Step 503: turning off the first current channel by using the switch unit when the display panel is under a three-dimensional display mode;

Step 504: Does the display device switch from the three-dimensional display mode to the two-dimensional display mode? if yes, proceeding to step 501, otherwise continuing step 503.

The first current channel is the current channel between the capacitor 208 of the display panel and the second sub-pixel area 205.

In the embodiment, step 501, 502, 503 and 504 are undertaken either in a first procedure or in a second procedure as below.

The first procedure is: step 501→step 502→step 503→step 504.

The second procedure is: step 503→step 504→step 501→step 502.

In the embodiment, the switch unit comprises the third TFT 209. The method also comprises:

The third gate of the third TFT 209 receives the first control signal.

The step turning on the first current channel by the switch of the display panel (i.e. step 501) comprises:

The third TFT 209 turning on the first current channel according to the first control signal.

The step turning off the first current channel by the switch unit (i.e. step 503) comprises:

The third TFT 209 turning of the first current channel according to the first control signal.

The image display method of the display device in the second embodiment of the present invention is similar with the first embodiment, except for that:

in the embodiment, the switch unit also comprises a fourth TFT 301. The method also comprises:

the fourth TFT 301 receives the second control signal and the first control signal;

the fourth TFT 301 provides the third gate of the third TFT 209 with the first control signal according to the second control signal.

In the embodiment, the second control signal is at high voltage level when the display panel is under two-dimensional display mode, and the fourth TFT 301 turns on a second current channel between the fourth source and the fourth drain of the fourth TFT 301 according to the second control signal;

the second control signal is at low voltage level when the display panel is under three-dimensional display mode, and the fourth TFT 301 turns off the second current channel according to the second control signal.

In the embodiment, the fourth TFT 301 alone controls the third TFT 209, so that the third TFT 209 is turned off when the display device is under three-dimensional display mode, and the capacitor 208 does not receive electric charge from the second sub-pixel area 205. Therefore no voltage difference exists between the second sub-pixel area 205 and the first sub-pixel area 204, hence no luminance difference exists between the second sub-pixel area 205 and the first sub-pixel area 204, in other words, the capacitor 208 has no impact upon luminance of the second sub-pixel area 205.

Please refer to FIG. 4, the embodiment is exemplified as below:

The 3D_EN is inverted through the metal oxide semiconductor 403 and output from the second control signal output end 402, and input into the fourth gate from the input end 302 of the fourth TFT 301 in order to drive the fourth TFT 301, hence the third TFT 209 is not turned on due to scan signals of the second scan line 203 when the display device is under three-dimensional display mode. More particularly, when the display device is under two-dimensional display mode, the 3D_EN is at low voltage level, and the inverted second control signal is at high voltage level. Then the switch of the fourth TFT 301 (i.e. the second current channel) is turned on and the scan signals of the second scan line 203 is input into the third TFT 209, thus the switch of the third TFT 209 (i.e. the first current channel) is turned on and electrical charge of the second sub-pixel area 205 is input into the capacitor 208. Then voltage difference appears between the first sub-pixel area 204 and the second sub-pixel area 205, and luminance difference appears between the first sub-pixel area 204 and the second sub-pixel area 205, thus color shift in the large viewing angle during two-dimensional display mode of the display device is solved.

When the display device is under three-dimensional display mode, the 3D_EN is at high voltage level, and the inverted second control signal is at low voltage level. Then the switch of the fourth TFT 301 (i.e. the second current channel) is turned off and the scan signals of the second scan line 203 is not input into the gate of the third TFT 209, thus the third TFT 209 does not turn on the first current channel and electrical charge of the second sub-pixel area 205 does not flow into the capacitor 208. Voltage applied on the first sub-pixel area 204 and voltage applied on the second sub-pixel area 205 are identical, and luminance of the first sub-pixel area 204 and that of the second sub-pixel area 205 are identical, so that luminance of the left-eye image and that of the right-eye image are identical.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A display device, comprising:
  a display panel, comprising:
  one or more pixel units, each pixel unit comprising:
    one or more sub-pixel unit;
  wherein the sub-pixel unit comprises:
    a first sub-pixel area;
    a second sub-pixel area;
    a first Thin Film Transistor (TFT) connected to a first scan line, a first data line, and the first sub-pixel area;
    a second TFT connected to the first scan line, the first data line and the second sub-pixel area;
    a capacitor for receiving electrical charge of the second sub-pixel area; and
    a switch unit for turning on a first current channel between the capacitor and the second sub-pixel area when the display panel is under a two-dimensional display mode and turning off the first current channel when the display panel is under a three-dimensional display mode,
    wherein the switch unit is used for receiving a first control signal and turns the first current channel on or off according to the first control signal,
    wherein the switch unit comprises:
    a third TFT, for receiving the first control signal and turning the first current channel on or off according to the first control signal, the third TFT comprising:
      a third drain;
      a third source; and
      a third gate for receiving the first control signal;
    a fourth TFT for receiving a second control signal and outputting the first control signal and providing the third gate of the third TFT with the first control signal according to the second control signal, the fourth TFT comprising:
a fourth drain;
a fourth source; and
a fourth gate for receiving the second control signal in order to control on or off a second current channel between the fourth drain and the fourth source;
wherein one of the third drain and the third source is connected to the capacitor, and the other is connected to the second sub-pixel area,
wherein one of the fourth drain and the fourth source is connected to the third gate of the third TFT, and the other is connected to the second scan line of the display panel.

2. The display device of claim 1, wherein the switch unit is used for controlling voltage difference between the first sub-pixel area and the second sub-pixel area according to the first control signal.

3. The display device of claim 1, wherein the first control signal is gate switching signal sent by the second scan line.

4. The display device of claim 1, wherein
the second control signal is at high voltage level to turn on the second current channel when the display panel is under the two-dimensional display mode;
the second control signal is at low voltage level to turn off the second current channel when the display panel is under the three-dimensional display mode.

5. The display device of claim 1, wherein the pixel unit further comprises a sharing line comprising:
a first section; and
a second section;
one of the fourth drain and the fourth source is connected to the third gate of the third TFT through the first section, and the other is connected to the second scan line of the display panel through the second section.

6. The display device of claim 5, wherein the sharing line is shared with three sub pixel units in the pixel unit.

7. A method of displaying an image using a display device comprising
one or more pixel units, each pixel unit comprising:
one or more sub-pixel unit;
wherein the sub-pixel unit comprises:
a first sub-pixel area;
a second sub-pixel area;
a first Thin Film Transistor (TFT) connected to a first scan line, a first data line, and the first sub-pixel area;
a second TFT connected to the first scan line, the first data line and the second sub-pixel area;
a capacitor for receiving electrical charge of the second sub-pixel area; and
a switch unit for turning on a first current channel between the capacitor and the second sub-pixel area when the display panel is under a two-dimensional display mode and turning off the first current channel when the display panel is under a three-dimensional display mode,
wherein the switch unit is used for receiving a first control signal and turns the first current channel on or off according to the first control signal,
wherein the switch unit comprises:

a third TFT, for receiving the first control signal and turning the first current channel on or off according to the first control signal, the third TFT comprising:
a third drain;
a third source; and
a third gate for receiving the first control signal;
a fourth TFT for receiving a second control signal and outputting the first control signal and providing the third gate of the third TFT with the first control signal according to the second control signal, the fourth TFT comprising:
a fourth drain;
a fourth source; and
a fourth gate for receiving the second control signal in order to control on or off a second current channel between the fourth drain and the fourth source;
wherein one of the third drain and the third source is connected to the capacitor, and the other is connected to the second sub-pixel area,
wherein one of the fourth drain and the fourth source is connected to the third gate of the third TFT, and the other is connected to the second scan line of the display panel,
the method comprising:
the fourth TFT receiving a second control signal and a first control signal;
the fourth TFT providing the third gate of the third TFT with the first control signal according to the second control signal;
the third gate of the third TFT receiving the first control signal;
turning on the first current channel by the third TFT according to the first control signal when the display panel of the display device is under a two-dimensional display mode;
turning off the first current channel by the third TFT according to the first control signal when the display panel is under a three-dimensional display mode, wherein the first current channel is a current channel between the capacitor of the display panel and the second sub-pixel area.

8. The method of claim 7, further comprising:
the switch unit controlling voltage difference between the first sub-pixel area and the second sub-pixel area through the first control signal.

9. The method of claim 7, wherein
the second control signal is at high voltage level when the display panel is under the two-dimensional display mode, and the fourth TFT turns on the second current channel between the fourth source and the fourth drain of the fourth TFT according to the second control signal;
the second control signal is at low voltage level when the display panel is under three-dimensional display mode, and the fourth TFT turns off the second current channel according to the second control signal.

* * * * *